DATA EDITING AND REVISION SYSTEM WITH MARGIN CONTROL

Filed Feb. 17, 1966 4 Sheets-Sheet 1

INVENTORS
Harold Lorber,
James D. Bungard,
Thomas J. Hartley,
Gerald J. Wensley
BY Harness, Dickey & Pierce
ATTORNEYS

DATA EDITING AND REVISION SYSTEM WITH MARGIN CONTROL

Filed Feb. 17, 1966 4 Sheets-Sheet 2

INVENTORS
Harold Lorber,
James D. Bungard,
Thomas J. Hartley,
Gerald J. Wensley
BY Darness, Dickey & Pierce
ATTORNEYS DATA EDITING AND REVISION SYSTEM WITH MARGIN CONTROL
Filed Feb. 17, 1966 4 Sheets-Sheet 3
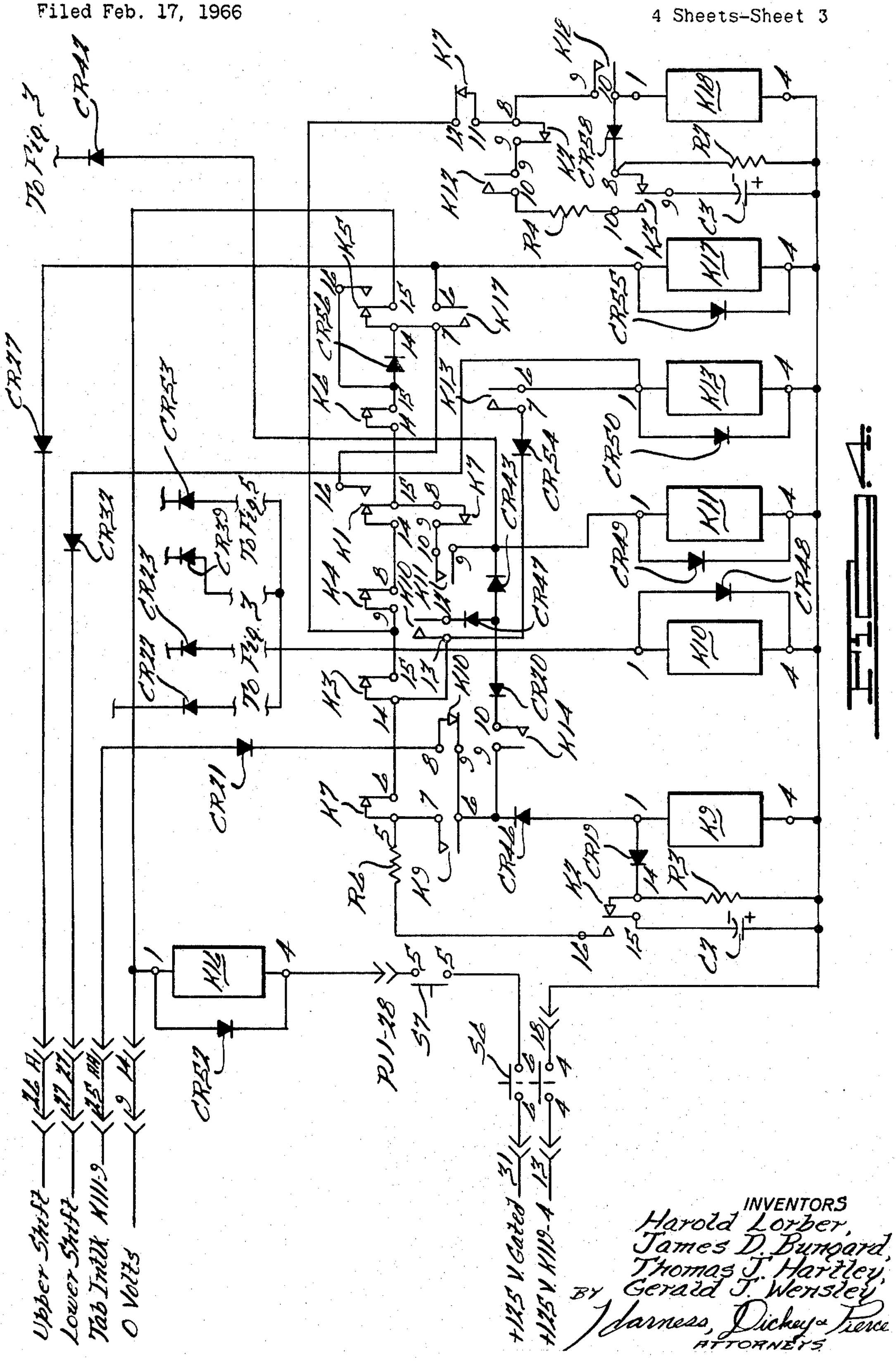
INVENTORS
Harold Lorber,
James D. Bungard,
Thomas J. Hartley,
Gerald J. Wensley
BY Harness, Dickey & Pierce
ATTORNEYS

DATA EDITING AND REVISION SYSTEM WITH MARGIN CONTROL

Filed Feb. 17, 1966

INVENTORS
Harold Lorber,
James D. Bungard,
Thomas J. Hartley,
Gerald J. Wensley
BY Darness, Dickey & Pierce
ATTORNEYS United States Patent Office 3,386,552

Patented June 4, 1968

3,386,552

DATA EDITING AND REVISION SYSTEM WITH MARGIN CONTROL

Harold Lorber, Dayton, Ohio, and James D. Bungard, East Detroit, Thomas J. Hartley, Roseville, and Gerald J. Wensley, Warren, Mich., assignors, by mesne assignments, to Intercontinental Systems, Inc., Los Angeles, Calif., a corporation of California Filed Feb. 17, 1966, Ser. No. 528,177
22 Claims. (Cl. 197—20)

ABSTRACT OF THE DISCLOSURE

There is herein disclosed apparatus for controlling the righthand margin of lines of type and apparatus for stopping an automatic typing operation upon the occurrence of predetermined grammatical conditions in the text being typed.

This invention relates to business machines and more particularly to business machines of the type comprising printer means operable manually and automatically through use of data storage control devices such as punched paper tapes and cards, magnetic tapes and discs, etc.

An object of this invention is to provide means for stopping a data storage device controlled operation of a printer upon the occurrence of a particular event which may be related to an editing function. Among the various occurrences at which an editing function may take place are the printing of a character, the completion of the printing of a word, the completion of the printing of a sentence, or the completion of the printing of a paragraph. In the present system, sensing means are provided to detect or sense each of these occurrences by the presence of certain conditions indicative of those occurrences. Control means are operable upon detection of the occurrences by the sensing means to stop the data storage device controlled operation of the printer for inspection by the operator and such editing as may be required.

Another object of this invention is to provide means for automatically changing or establishing righthand margins of text during data storage device controlled operation of a printer. Means are provided to establish a margin control zone within which a line of type will be terminated and whereat a carrier return function will be initiated as needed to begin the next line of type. The text to be used during automatic changing of the righthand margins may be prepared with all words hyphenated. In the present invention, sensing means are provided to sense the occurrence of certain conditions in the margin zone and to initiate operation of control means by which the operations necessary to obtain the desired margin changes can be obtained. The sensing means are adapted to sense or detect the hyphenation of a word, the end of a word, the end of a sentence, and the end of a paragraph. The controlled response to the sensing of these occurrences is varied depending upon whether the occurence is sensed in or out of the margin zone. When the occurrence is sensed in the margin zone, a carrier return may be initiated to start a new line of type in the proper position.

A further object is to provide apparatus by which the first mentioned means for stopping a data storage nevice controlled operation of a printer upon the occurrence of a particular event related to an editing function may be combined with the second mentioned means for automatically changing righthand margins of text being printed by data storage device controlled operations of a printer.

It will be apparent to those skilled in the art to which the invention relates that the inventive principles are applicable in their entirety or in part to other systems utilizing other types of data storage devices and other types of code arrangements.

Referring now to the drawings in which the illustrative and presently preferred form of the invention is shown, FIGURE 1 is part of a schematic circuit diagram of the invention;

FIG. 3 is another part of the schematic circuit diagram of the invention;

FIG. 4 is another part of the schematic circuit diagram of the invention;

Figures 1, 2:
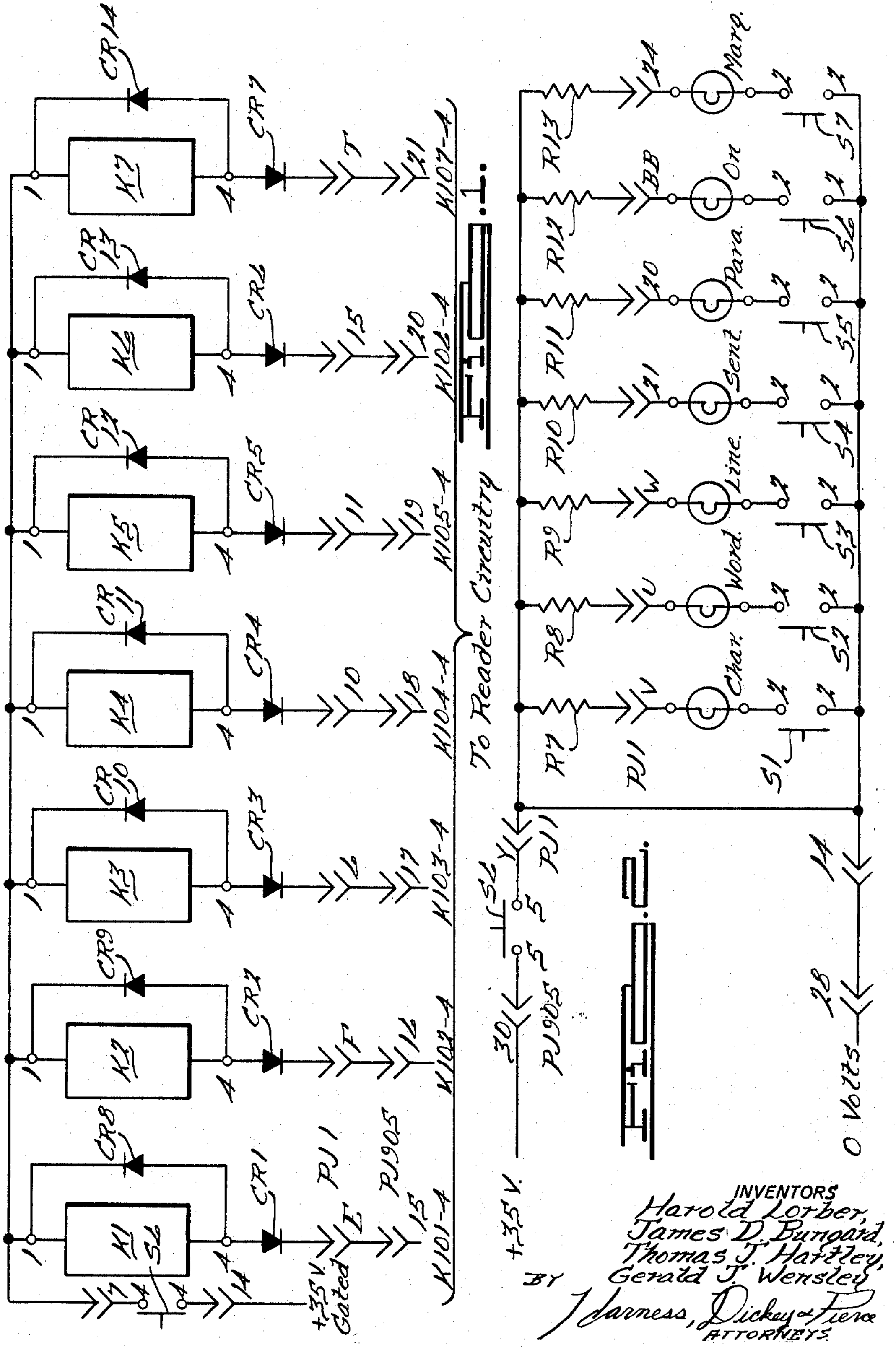
FIG. 2 is another part of the schematic circuit diagram of the invention.
Figure 2:
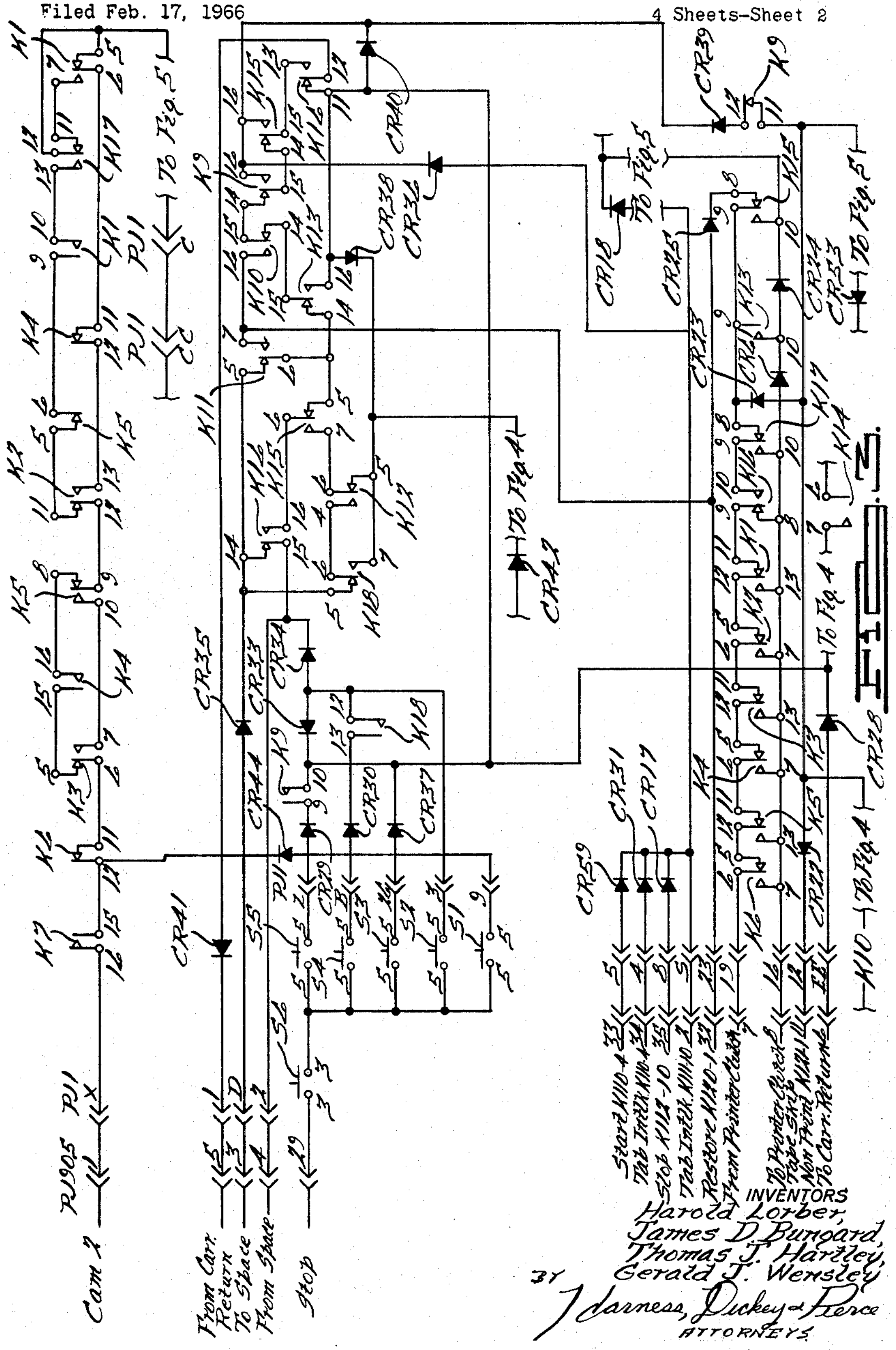

In the illustrative embodiment, electrical control components such as relays (designated K), capacitors (designated C), switches (designated S), resistances (designated R), and diodes (designated CR) are utilized. It will be apparent to those skilled in the art to which this invention relates that other types of electrical control components including electronic and semi-conductor devices may be employed to obtain the desired control functions in utilization of the inventive principles.

IN GENERAL

In general, the invention has been incorporated in an automatic writing system of the type disclosed in copending application Ser. No. 227,767 filed Oct. 2, 1962, for Writing System. Systems of the type described in the aforementioned application are now generally known and the operational details of the printer and reader apparatus of such systems, which are utilized with the present invention, are not described in detail herein.

The automatic writing system comprises a printer, in the form of an electric typewriter, having a reader means and a punch means associated therewith. The typewriter is operable manually to print information and the punch means is selectively actuatable during manual operation of the typewriter to code a paper tape or card type data storage device and store the printed information. A seven channel binary code has been adopted in the present system with an eighth channel for a delete code. The typewriter is also operable automatically to print coded information stored in a data storage device by operation of the reader means. The punch means may be operated during reader operation with or without operation of the typewriter.

System control circuitry is provided to enable selection of any of a number of different modes of operation and to modify the various modes of operation.

The present invention is illustratively embodied in edit and margin control circuitry formed as a separate unit and interconnected with the various writing system circuits as needed by a plug-in arrangement.

The edit and margin control circuitry has been devised so as not to interfere with the standard writing system controls and the edit and margin control system may be selectively employed without disrupting any other writing system operations. The edit and margin control circuitry is selectively operative during normal automatic operation of the printer by the reader and in, Tape Skip, and Non-Print modes of operation of the writing system.

The writing system with which the present illustrative embodiment of the invention has been incorporated utilizes a common power source for the typewriter, punch, and reader which are synchronously operated. The operational cycles of the typewriter, punch, and reader are related to a 360° rotation of their drive shafts. The typewriter is operable by manual or automatic selection of a printing or functional operation at the beginning of a cycle. Timing cams are utilized to cause the selected operation to be performed at a predetermined time in the cycle. Each of the typewriter and reader and punch is provided with clutches which enable their respective drive shafts to be rotated at the appropriate times. Actuation of the typewriter clutch enables the typewriter drive shaft to be rotated and the selected operation to be performed. Actuation of the reader clutch allows the reader drive shaft to be rotated to advance the data storage device being read to the next code position. Actuation of the punch clutch allows the punch drive shaft to be rotated to advance the data storage device being coded to the next code position. The automatic writing system includes start-stop circuitry for starting and stopping operation, restore circuitry for enabling automatic writing system operation to continue after some deviation from normal procedure has occurred, and interlocking circuitry to prevent further operation of the automatic writing system until some operation has been completed. A tape skip-non-print circuit is also provided to enable the automatic operation of the typewriter to be interrupted and portions of a coded data storage device being used to cause automatic operation to be bypassed.

Referring now to the drawings, it will be seen that the control circuitry of the present invention is interconnected with certain of the aforementioned circuits of the automatic writing system.

*Timing cam circuit*

A timing circuit in the automatic writing system, designated Cam 2, FIG. 3, is connected to the edit and margin control system. A pulse is generated on the Cam 2 circuit in the automatic writing system when a timing cam on the typewriter drive shaft closes after a particular operation has been selected and is being carried out.

*Carrier return circuit*

The typewriter carrier return controlling circuit of the automatic writing system is connected at From Carrier Return, and To Carrier Return, FIG. 3, through the edit and margin control system. Any pulse initiated in the automatic writing system to cause a carrier return operation is carried into the edit and margin control system via From Carrier Return. In order to obtain a carrier return operation, a pulse must be applied over To Carrier Return through the edit and margin control system.

*Spacing circuit*

The typewriter spacing control circuit of the automatic writing system is connected through the edit and margin control system across From Space and To Space, FIG. 3. Any pulse iniated in the automatic writing system to cause a spacing function in the typewriter is carried into the edit and margin control system via From Space. In order to obtain a spacing operation, a pulse must be applied over To Space through the edit and margin control system.

*Stop circuitry*

The typewriter has a stop relay by which automatic operation may be terminated. The stop relay is connected by a circuit designated Stop, FIG. 3, to the edit and margin control system so that the automatic operation of the typewriter may be terminated by applying a pulse over the Stop circuit. The stop circuitry in the automatic writing system also includes holding circuitry by which the operation of the stop relay may be delayed until some operation is completed. The stop holding circuitry is connected through the edit and margin control system across the lines designated Start K110–4 and Stop K112–10, FIG. 3, so that the operation of the stop relay may be delayed by the edit and margin control circuitry when necessary.

*Tab interlock circuitry*

The automatic writing system has tab interlock circuitry by which the operation of the typewriter and the system may be delayed. The tab interlock circuitry is connected by circuits designated Tab Interlock K111–4, K111–9, and K111–10, FIGS. 3 and 4, to the edit and margin control circuitry so that operation of the automatic writing system may be delayed as necessary.

*Restore circuitry*

The automatic writing system has control circuitry for restoring automatic operation after interruption. A circuit designated Restore, FIG. 3, is connected to the edit and margin control circuitry to enable automatic operation to be restored by the edit and margin control system.

*Printer clutch circuitry*

The typewriter is provided with clutch circuitry by which operation of the typewriter clutch is controlled. Any signal initiated in the automatic writing system to actuate the typewriter clutch is carried on From Printer Clutch, FIG. 3, to the edit and margin control system. Any signal in the edit and margin control system utilized to actuate the typewriter clutch is carried via To Clutch, FIG. 3, from the edit and margin control system.

*Tape skip, non-print circuitry*

The automatic writing system has control circuitry for a mode of operation in which portions of a coded data storage device may be skipped through the reader without printing during automatic operation. Control circuitry for a mode of operation in which the coded data storage device is read without printing is also provided. A circuit designated Tape Skip, Non-Print K121–1, FIG. 3, is connected to the edit and margin control circuitry to enable a pulse generated by selection of the Tape Skip or Non-Print modes of operation to be sent to the edit and margin control system.

*Upper and lower shift circuitry*

Whenever an upper or lower shift operation pulse occurs in the automatic writing system, a pulse is sent to the edit and margin control system over the circuits designated Upper Shift and Lower Shift, FIG. 4.

*Power sources*

The edit and margin control circuitry is adapted to be connected across the power supply of the automatic writing system and includes connections to 0 volt, 125 volts gated and ungated, and 35 volts gated and ungated, FIGS. 1, 2, 4, and 5.

*Control panel switches*

A control panel having a plurality of operation mode selection switches is provided for the edit and margin control system. An on-off switch S6 controls the power supply, FIGS. 1, 2, and 4, and the Stop circuit, FIG. 3.

A control switch S7 is provided for selecting the margin control mode of operation by connecting contacts S7(5) in a margin control relay circuit, FIG. 4.

A series of control switches S1, S2, S3, S4, and S5, are provided to select the various editing and revision modes of operation, FIG. 3, and to energize mode indicating light circuits, FIG. 2.

*Code sensing relays*

The edit and margin control circuitry includes code sensing relays K1, K2, K3, K4, K5, K6, and K7, FIG. 1, which are connected across +35 v. and the reader circuitry of the automatic writing system. Whenever a code is read by the reader, a pulse is sent from the automatic writing system circuitry to each of the code sensing relays corresponding to the code being read. The code sensing relays are picked in accordance with the code read and their contacts in the edit and margin control circuitry are transferred.

RIGHTHAND MARGIN CONTROL APPARATUS

Figure 5:
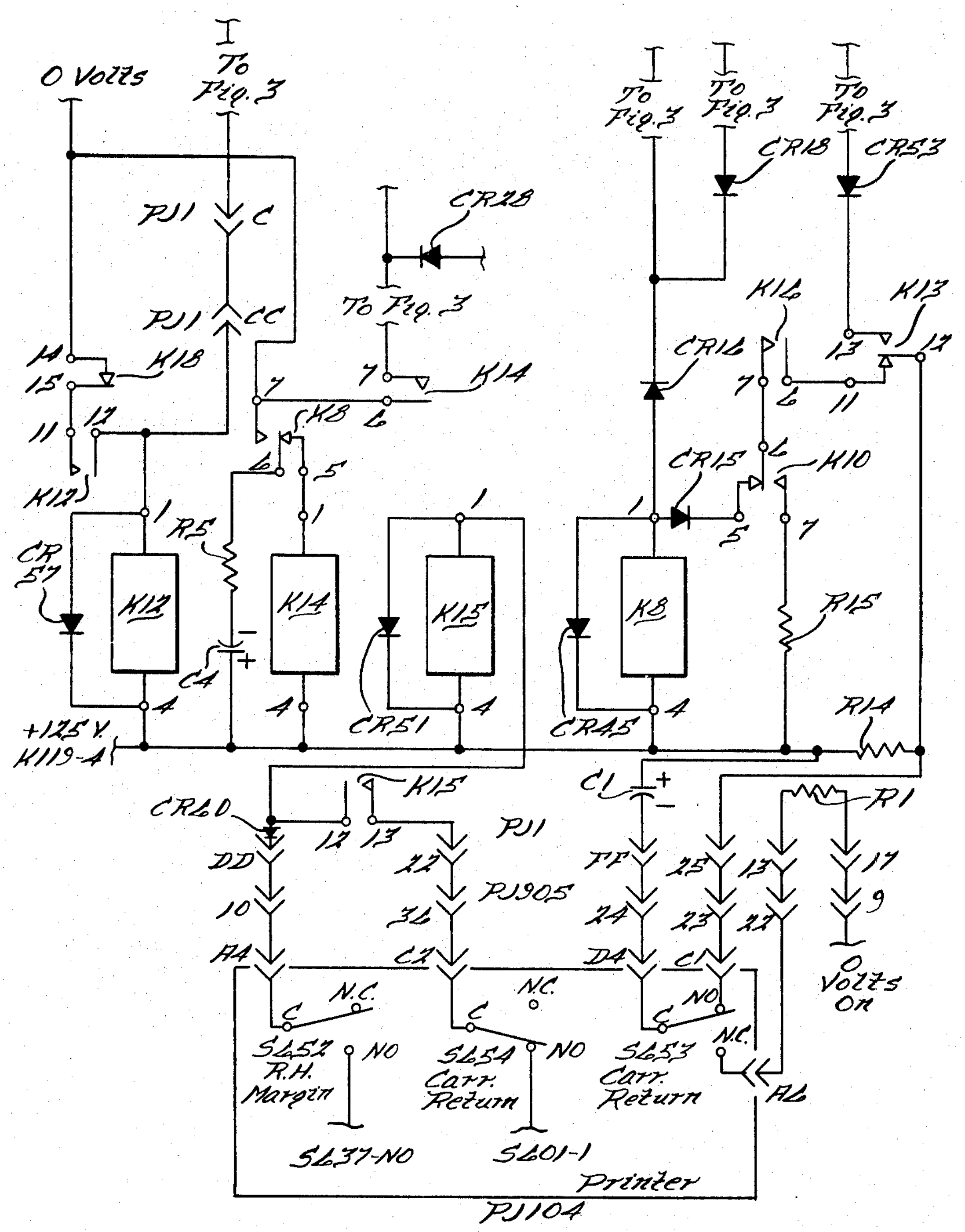
FIG. 5 is still another part of the schematic circuit diagram.

In the margin control mode of operation during automatic operation of the printer by the reader in accordance with information on a coded data storage device, the righthand margin of the text is to be maintained within predetermined limits which may be adjustably set by righthand margin control apparatus associated with the printer. The righthand margin control apparatus comprises a margin zone locating switch S652, FIG. 5, in the printer which is opened whenever the righthand margin zone is reached and closes after a predetermined number of spaces in the margin zone have been passed. In a printer of the type utilized in the illustrative embodiment, the length of the margin zone is 12 spaces and the switch S652 closes after 12 spaces have been utilized. In order to provide an unlimited margin zone in the present invention, margin zone extending means comprising a switch S654, FIG. 5, is provided in a holding circuit for margin zone sensing relay K15. The holding circuit is established by opening of switch S652 when the margin zone is reached and is enabled by transfer of contacts K15(12, 13). Margin zone sensing relay K15 is held until a carrier return functional operation in the printer closes the switch S654 to disable the holidng circuit. Also, in order to provide or force a supplemental carrier return signal at certain times, a switch S653, FIG. 5, in a capacitor circuit is operable by the carrier return mechanism in the printer from a normal capacitor discharging position, connecting the capacitor circuit to a carrier return forcing relay K8, to a capacitor charging position, connecting capacitor C1(2MF)(150V) via FF-24-D4-C653 (C,NC)-A6-22-13-R1(39K)(1/2W)-17-28 to 0 volts for charging of the capacitor.

MARGIN CONTROL MODE OF OPERATION

The margin control mode of operation is selected by closing on-off switch S6 and selection switch S7, FIG. 4. When S6 and S7 are actuated, margin control relay K16 is connected across +125 v. Gated-31-S6(6)-S7(5)-K16(1, 4)-14-9 to 0 volts. The various margin control relay contacts are transferred to condition the various circuits for margin control operation.

In the margin control mode of operation, it is desired to terminate a line of type when the margin zone is reached or as soon thereafter as grammatically possible. The lines of type are grammatically terminable upon completion of a hyphenable syllable, completion of a word, or upon the occurrence of such punctuation as a hyphen, a period, a question mark, or an exclamation mark.

*The use of the hyphen*

The margin zone control apparatus may be advantageously utilized in connection with coded information which has been coded with a hyphen after every hyphenable syllable in every word. In this mode of operation, whenever a hyphen occurs before the margin zone is reached, control circuitry is provided to eliminate the hyphen from the printed information. Whenever a hyphen occurs in the margin zone, control circuitry is provided to cause the hyphen to be printed and to cause a carrier return whereby the coded information succeeding the hyphen will be printed on the next line.

In the illustrative embodiment, the hyphen code is a channel 7 code. Thus, when a hyphen code is read in the reader, code sensing relay K7, FIG. 1, will be picked across +35 v. Gated-14-S6(4)-7-K7(1, 4)-CR7-T-21 to K107(-4).

*Hyphen outside margin zone*

When the hyphen occurs outside the margin zone, i.e., before the margin zone is reached, it is desired to prevent the hyphen from being printed. After the hyphen is read in the reader, the hyphen code signal is stored in the automatic writing system until the printer clutch is actuated which causes the hyphen to be printed. Therefore, the printer clutch circuit is connected through suitable control circuitry of the edit and margin control system across From Printer Clutch and To Printer Clutch, FIG. 3. The printer clutch margin controlled circuitry comprises a decoding matrix of contacts of all of the code sensing relays except contacts of the hyphen, code 7, sensing relay. Thus, if any code other than only a hyphen code 7 is read, at least one of the decoding matrix contacts K6(6, 7), K5(12, 13), K4(6, 7), K3(12, 13), K2(6, 7), K1(12, 13), FIG. 3, are transferred to connect From Printer Clutch and To Printer Clutch which causes the printer clutch to be actuated and causes the code being read to be printed.

If the margin control is off, margin control relay K16 is not energized and contacts K16(8, 9), FIG. 3, connect From Printer Clutch and To Printer Clutch so that the hyphen code 7 will be printed in a normal manner.

When the margin control is on, margin control relay contacts K16(9, 10), FIG. 3, are transferred to connect From Printer Clutch and To Printer Clutch through hyphenating control circuitry. The hyphen and the underscore are both selected by the same printer mechanism and have the same code 7. However, the underscore is preceded by an upper shift code which actuates an upper shift relay K17, FIG. 4, via Upper Shift-26-A-CR27-K17(1, 4)-18-S6(4)-13-K119(-4)-+125 v. Consequently, contacts K17(9, 10), FIG. 3, are transferred whenever an underscore code is read and From Printer Clutch is connected with To Printer Clutch to actuate the clutch and print the underscore. In some cases, it may be desired to print the hyphen even though it occurs outside sired to print the hyphen even through it occurs outside the margin zone. In such cases, a lower shift precedent code is utilized to indicate that the hyphen is to be printed. A pulse on Lower Shift, FIG. 4, picks relay K13 and contacts K13(9, 10), FIG. 3, are transferred to connect From Printer Clutch and To Printer Clutch so that the hyphen is printed.

If the hyphen is read out of the margin zone and not to be printed, From Printer Clutch, FIG. 3, is connected via contacts K17(8, 9) and margin zone relay contacts K15(8,9)-CR25-23-32 to K120(-1) Restore. When the Restore circuit is energized, the printer is caused to cycle without printing so that the hyphen is not printed and the reader and printer move on to the next code.

*Hyphen in margin zone*

If the hyphen code is read in the margin zone, then the hyphen is printed because contacts K15(9, 10), FIG. 3, are transferred in the margin zone. When the margin zone is reached, switch S652, FIG. 5, is actuated by the bell ringing mechanism of the typewriter to connect contacts S652 (C, NO) which connects margin zone relay K15 between sources of opposite potential +125 v. K119(-4) and S637(NO). When margin zone relay K15 is energized, contacts K15(12, 13), FIG. 5, are also transferred to complete a holding circuit to S601(-1) through disabling switch S654 which remains closed until a carrier return function occurs in the printer. Thus, contacts K15(9, 10), FIG. 3, will remain transferred in the margin zone until a carrier return occurs so that any hyphen read in the margin zone will be printed as previously described.

When a hyphen is read in the margin zone and printed, it is necessary to have a carrier return thereafter. In order to provide a carrier return for each hyphen printed in the margin zone, carrier return forcing means are provided and comprise a carrier return forcing relay K8, FIG. 5, which is connected across sources of opposite potential on From Printer Clutch and 125 v. K119(-4) across CR16 when contacts K15(9, 10), FIG. 3, are transferred. Contacts K8(6, 7), FIG. 5, are transferred to connect a capacitor C4 between sources of opposite potential +125 v. K119(-4) and 0 volt and capacitor C4 is charged while the hyphen is being printed. At the same time, the pulse on From Printer Clutch is also carried via CR18, FIG. 3, to the printer interlock circuits to delay further operation until a carrier return is forced. Also, at the same time, hyphen sensing relay K10, FIG. 4, is picked through CR23 to transfer contacts K10(6, 7), FIGURE 5, and prevent additional carrier returns from being forced by discharge of capacitor C1 which is charged by each carrier return. When the pulse on From Printer Clutch is terminated, carrier return relay K8, FIG. 5, drops out and contacts K8(5, 6) are transferred. At this time, capacitor C4 discharges through carrier return delay relay K14 which transfers contacts K14(6, 7), FIGURE 5, and connects To Carrier Return to 0 volt through CR28. A carrier return function is obtained in the typewriter and switch S654 is opened to disable the holding circuit for the margin zone control relay K15.

CHARACTER SENSING OPERATIONAL MODE

The object in the character sensing mode of operation is to energize a stop relay (not shown) by directing a pulse to the system terminal designated Stop each time a character is printed.The printing of a character is sensed by the presence in any multiple code of a code 7 which forms part of every character code.

The character sensing mode of operation is selected by closing contacts S6(3) of the on-off switch S6 and by closing contacts S1(5) of the selection switch S1, FIG. 3.

Each time a character identifying code 7 is read by the automatic writing system reader, a code sensing relay K7, FIG. 1, is picked via K107(-4)-21-T-CR7-K7(1, 4)-7-S6(4)-14 to +35 v. gated. Character contacts K7(16, 15), FIG. 3, in a timing cam controlled circuit designated Cam 2, are closed each time a character code 7 is read in the reader. When the timing cam controlled circuit is energized, after a printing operation in the printer, the stop relay is picked through PJ905-PJ1-K7(16, 15) (a character read)-K6(12)-CR44-9-S1(5)-S6(3)-29 to Stop.

*Character sensing operational mode with margin control*

A margin control circuitry has no effect on the character mode of operation. When the margin control is "on," S7, FIG. 4, is closed to energize margin control relay K16 via +125 v. Gated-31-S6(6)-S7(5)-PJ1(-28)-K16(1, 4)-14-9-0 volts and transfer the contacts of K16. Since there are no contacts of K16 in the character circuit, it will be obvious that the margin control has no effect on the character mode of operation.

WORD SENSING OPERATIONAL MODE

The object in the word mode of operation is to energize the stop relay each time a word is completed. The completion of a word is sensed by the fact that the end of a word is followed by a space.

*Word sensing, margin control off*

With the margin control off, whenever a space circuit in the automatic writing system, designated From Space, FIG. 3, is energized by the presence of a space code (3) in the reader, a stop relay circuit designated Stop is energized via From Space-4-2-CR34-3-S2(5)-S6(3)-29-Stop. At the same time, a space actuating solenoid circuit, designated To Space, receives a pulse carried via From Space-4-2-K16(14, 15)(margin control off)-CR35-D-3 and To Space. Thus, the space function will occur in the printer and the automatic will terminate.

*Word sensing, margin control on, in margin zone*

When the margin control is on, it is necessary to obtain a carrier return when a space code occurs in the margin zone at the completion of a word in the margin zone.

In the "word" mode of operation with the margin control on and a word ending in the margin zone, margin control relay K16, FIG. 4, will be energized and contacts K16(14, 16), FIG. 3, transferred so that the pulse on the From Space circuit will be diverted from the To Space line through K16(15, 16)(margin control on)-K15(6, 7) (in the margin zone)-K12(5, 6)(not punctuation)-CR38-K16(11)-CR28-EE-6 and carried over To Carrier Return causing a carrier return function in the printer. At the same time, the space pulse will be transferred through CR34-3-S2(5)-S6(3)-29 and To Stop to stop further operation of the printer as previously described.

Also, the space pulse will be carried via CR42 to pick righthand margin and space sensing relay K11 and via CR43 to pick hyphen and righthand margin sensing relay K10. When relay K10 is picked by the space pulse, contacts K10(12, 13), FIG. 4, are transferred to establish a holding circuit from 0 volt through 9-14-K5(14, 15)-CR56-K6(14, 15)-K1(14, 15)-K4(8, 9)-K3(14, 15)-K10(12, 13)-CR47-K10(1, 4)-18-S6(4)-13 and 125 v. K119-4. It may be noted that there are no K2, carrier return, contacts and no K7, hyphen, contacts in the holding circuit so that K10 will continue to hold through succeeding carrier returns or hyphens. Whenever relay K10 is picked, contacts K10(6, 7), FIG. 5, are transferred to disable the carrier return forcing circuitry.

When relay K11 is picked by the space pulse, contacts K11(9, 10), FIG. 4, are transferred to establish a holding circuit from 0 volt through 9-14-K5(14, 15)-CR56-K6(14, 15)-K1(15)-K7(8, 9)-K11(9, 10)-K11(1, 4)-18-S6(4)-13 and 125 v. K119-4. It may be noted that there are no K2, carrier return, contacts and no K3, space, contacts in the holding circuit so that K11 will continue to hold through successive carrier returns or spaces. However, K7 contacts are included so that a hyphen or any character code will drop out relay K11.

After a space pulse is converted to a carrier return, any succeeding space pulse on From Space, FIG. 3, will be diverted through K16(15, 16) (margin control on)-K15(5, 6) out of margin zone due to preceding carrier return)-K11(6, 7) (a space previously sensed)-23-32 and Restore K120-1, FIG. 3, which causes the automatic writing system to proceed to the next bit. In this manner, the next line of type will begin at the lefthand margin.

*Word sensing, margin control on, outside margin zone*

If the space occurs outside of the margin zone, the space pulse will be carried via From Space, FIG. 3, -4-2-K16(15, 16) margin control on)-K15(5, 6) (out of margin zone)-K11(5, 6) (out of margin zone-K16(14)-CR35-D-3 and To Space, and the space mechanism of the printer will be actuated and the printer operation stopped.

LINE SENSING MODE OF OPERATION

In the line mode of operation the object is to stop the printer operation whenever a line is completed. The completion of a line of coded text is normally sensed by receipt of a carrier return code 2.

*Line mode, margin control off*

When a carrier return pulse is received on the carrier return circuit designated From Carrier Return, FIG. 3, with the margin control off, it is carried via 5-1-CR41-K16(11, 12) (margin control off), FIG. 3, -CR28-EE-6 and the carrier return circuit, designated To Carrier Return, FIG. 3, to cause a carrier return function in the printer and at the same time is carried via 5-1-CR41-K16(11, 12)-CR37-26-S3(5)-S6(3)-29 to Stop, FIG. 3.

*Line mode, margin control on, out of margin zone*

When the margin control is on, it is desired to convert a carrier return signal received out of the margin zone into a space signal unless the carrier return signal is preceded by a precedent code. A precedent code is utilized to prevent carrier return signals used in connection with headings in the text or the like from being converted to a space signal. In the illustrative embodiment, the carrier return code is designated 2 and the precedent code is the upper-lower case shift. The presence of an upper shift code, 4, in the automatic writing system is adapted to energize an upper shift sensing relay K17 via a circuit designated Upper Shift and the presence of a lower shift code in the automatic writing system is adapted to energize a lower shift sensing relay K13 via a circuit designated Lower Shift, FIG. 4.

With the margin control on, margin control relay K16, FIG. 4, is energized, and until the margin zone is reached, margin zone relay K15, FIG. 5, will not be energized. When a carrier return signal is received out of the margin zone at From Carrier Return, it is carried via CR41-K16(12, 13) (margin control on)-K15(14, 15) (out of margin zone)-K9(14, 15) (not a paragraph)-K10(14, 15) (not at righthand margin)-K13(14, 15) (no precedent code)-K11(5, 6) (not at righthand margin)-K16(14)-CR35-D-3-To Space. Thus, a carrier return signal initiated in the automatic writing system is converted in the edit and margin control system to a space signal which causes a spacing function in the printer.

With the margin control on and K16 energized, if a precedent code is followed by a carrier return code, such as at the end of an indented heading, lower shift sensing relay K13, FIG. 4, is energized from Lower Shift through 27-27-CR32-K13-18-S6(4)-13-K119-4 + 125V. Contacts K13(15, 16) are closed and the carrier return signal is carried through K16(12, 13) (margin control on)-K15-(14, 15) (out of margin zone)-K9(14, 15) (not a paragraph)-K10(14, 15) (out of margin zone)-K13(15, 16) (a lower shift precedent code sensed)-K16(11)-CR28-EE-6-To Carrier Return and also through CR37 to Stop. Thus, a carrier return is obtained and further automatic operation of the writing system is stopped.

*Line mode, margin control on, in margin zone*

With margin control on and in the margin zone, a carrier return signal will be effective through From Carrier Return, FIG. 3, -5-1-CR41-K16(12, 13) (margin control on)-K15(15, 16) (in the margin zone)-CR40-CR28, FIG. 3, -EE-6 and To Carrier Return and also through CR37, FIG. 3, To Stop. At the same time, the pulse will be carried via CR39, FIG. 3, -K9(11, 12) (no paragraph sensed)-K10(1, 4), FIG. 4, -18-S6(4)-13-125V K119-4 to pick relay K10 and prevent any additional carrier returns by transferring contacts K10(6, 7), FIG. 5, as previously described.

SENTENCE MODE OF OPERATION

*In general*

In the sentence mode of operation, the object is to detect the end of a sentence and to stop the reader operation upon completion of a sentence. A sentence is ended by a period (.), a question mark (?), or an exclamation mark (!). The question mark and exclamation mark selection apparatus of a printer is also commonly utilized for selecting other marks depending upon whether the lower or upper case shift is employed. The codes for the sentence ending marks, in the illustrative embodiment, are 2, 3, 5, 7 for the period, 1, 2, 3, 5, 7 for the exclamation mark, and 1, 4, 7 Upper Shift for the question mark. It may be noted that each punctuation code contains a 7. Also, the degree mark selection is the upper case of the exclamation mark selection. Furthermore, a period may be used other than at the end of a sentence. In the present system, successive sentences in a text are separated by the puncturation and two spaces or by the punctuation and a space and a carrier return as at the end of a paragraph. Thus, a sentence ended by a period is detectable by the successive codes period-space-space or period-space-carrier return.

*Sentence mode, margin control off, period*

When the margin control is off in the sentence mode of operation, reception of a period code, i.e., 2, 3, 5, 7 will energize relay K7, FIG. 1, among others, and close contacts K7(15, 16), FIG. 3, so that a pulse generated by closure of the timing cam in the printer at the end of an operational cycle will be carried along an input line designated Cam 2 via PJ905-PJ1-K7(15, 16) through a punctuation mark decoding matrix, FIG. 3, comprising code sensing relay contacts K6(11, 12) (none of the punctuation codes have a code 6)-K3(6, 7) (transferred by the code 3 pulse in the period code)-K5(9, 10) (transferred by the code 5 pulse in the period code)-K2(12, 13) (transferred by the code 2 pulse in the period code)-K4(11, 12) (there being no code 4 in the period code)-K1(5, 6) (there being no 1 code in the period code) and through a punctuation sensing relay circuit, FIG. 5, PJ1C-PJ1CC-K12(1, 4)-18-S6(4)-13 to 125 v.-K119-4 to energize the punctuation sensing relay K12. Contacts K12(11, 12), FIG. 5, are closed to provide a holding circuit through K12(11, 12)-K18(14, 15)-14-9 to 0 volts.

When a space pulse is received next, it is carried over From Space, FIG. 3, via K16(14, 15) (margin control off)-CR35-D-3-and To Space to cause the printer to complete a space function. The Stop circuit is not energized because contacts K18(12, 13) are open. The space code is a 3 and the space pulse also energizes code sensing relay K3, FIG. 1, to transfer contacts K3(9, 10), FIG. 4, in circuitry for a space sensing relay K18. When the K3(9, 10) contacts are transferred, a capacitor C3 is charged from 125 v. K119-4-via 13-S6(4)-18-C3-K3(9, 10)-R4-K12(9, 10) (transferred by relay K12, FIG. 4, when punctuation sensed and holding) and a decoding matrix comprising contacts of each of the other code sensing relays including K2(8, 9) (closed after the punctuation pulse terminated)-K7(11, 12) (closed after the punctuation pulse terminated)-K4(8, 9)-K1(14, 15)-K6(14, 15)-CR56-K5(14, 15) (closed after the punctuation pulse terminated)-14-9 to 0 volts. When the space pulse terminates and relay K3 drops out, contacts K3(8, 9) are transferred and the space sensing relay K18 is picked by the capacitor C3 causing contacts K18(9, 10) to be transferred to establish a holding circuit through K18(9, 10)-K2(8) (the carrier return code is a code 2 so that transferable K2 contacts are eliminated from the holding circuit)-K7(11, 12)-K4(9, 8)-K1(14, 15)-K6(14, 15)-CR56-K5(14, 15)-14-9 to 0 volts. At the same time, the holding circuit for relay K12, FIG. 5, is disabled by transfer of contacts K18(14, 15) and relay K12 drops out. Also contacts K18(12, 13), FIG. 3, in the sentence stop circuit are transferred so that the next, (2*d*), space pulse is carried via From Space, FIG. 3, -4-2-CR34-K18(12, 13)-CR30-B-S4(5)-S6(3)-29 to Stop. At the same time the 2*d* space pulse is carried via K16(14, 15) (margin control off)-CR35-D-3 to Space causing the printer to complete a spacing function before the printer operation is stopped.

Similarly, if the second pulse following the punctuation pulse is a carrier return pulse, it will be carried From Carrier Return, FIG. 3, along 5-1-CR41-K16(11, 12) (margin control off)-CR33-K18(12, 13) (transferred by sensing of previous space by relay K18)-CR30-B-S4(5)-S6(3)-29 to Stop and also via CR28, FIG. 3, -EE-6 to Carrier Return to cause the printer to complete a carrier return function.

If there is no 2*d* space code 3 or carrier return code 2 pulse, one or more of the contacts K7(11, 12), K4(8, 9), K1(14, 15), K6(14, 15) or K5(14, 15), FIG. 4, will be transferred by the next pulse and the holding circuit for K18 will be disabled.

*Sentence mode, margin control off, exclamation mark*

When the margin control is off in the sentence mode of operation, reception of an exclamation mark code, i.e., 12357, will pick the code sensing relays K1, K2, K3, K5, and K7, FIG. 1.

When a pulse is received from Cam 2, FIG. 3, it will be carried via PJ905-PJ1-K7(15, 16) (transferred by the code 7 pulse in the exclamation mark code)-K6(11, 12)

(there being no code 6)-K3(6, 7) (transferred by the code 3 pulse in the exclamation mark code)-K5(9, 10) (transferred by the code 5 pulse in the exclamation mark code)-K2(12, 13) (transferred by the code 2 pulse in the exclamation mark code)-K4(11, 12) (there being no code 4)-K1(6, 7) (transferred by the code 1 pulse in the exclamation mark code)-K17(11, 12) (in the lower shift position)-PJ1C-PJ1CC-K12-18-S6(4)-13 to 125 v. K119(4). Thus, the punctuation sensing relay K12 will be picked as herein before described and the following space-space codes or space-carrier return codes will cause the Stop relay to be energized as previously described.

If a degree mark code, i.e., 1, 2, 3, 5, 7, and upper shift, is received, the upper shift sensing relay K17, FIG. 4, will be picked via Upper Shift-26-A-CR27-K17(1, 4)-18-S6(4)-13- 125 v. K119-4 and is held by transfer of contacts K17(6, 7) through K1(15, 16) (transferred by the code 1 pulse in the degree mark code)-K6(14, 15) (there being no 6 code)-K5(15, 16) transferred by the code 5 pulse in the degree mark code)-14-9 to 0 volts. Contacts K17(12, 13), FIG. 3, are transferred to disable the exclamation mark circuitry.

*Sentence mode, margin control off, question mark*

The reception of a question mark code, i.e., 147 along with an upper shift code, with the margin control off, will pick the code sensing relays K1, K4, K7, FIG. 1, and the upper shift relay K17, FIG. 4. The selection of the exclamation mark requires actuation of the shift mechanism of the printer from lower case to upper case in the printer so that a pulse will be received on a line designated Upper Shift, FIG. 4, causing the upper shift relay K17 to be picked via 125 v. K119 (-4)-13-S6(4)-18-K17 (1, 4)-CR27-A-26 to Upper Shift. When a pulse is received from Cam 2, FIG. 3, it will be carried via PJ905-PJ1-K7 (15, 16) (transferred by the code 7 pulse in the question mark code)-K6 (11, 12) (there being no code 6)-K3 (5, 6) (there being no code 3)-K4 (15, 16) (transferred by the code 4 pulse in the question mark code)-K5 (8, 9) (there being no code 5)-K2 (11, 12) (there being no code 2)-K5 (5, 6) (there being no code 5)-K1 (9, 10) (transferred by the code 1 pulse of the question mark code)-K17 (12, 13) (transferred by the upper shift sensing relay K17)-PJ1(C), FIG. 5, -PJ1 (CC)-K12 (1, 4)-18-S6(4)-13 to 125 v. K119 (4). Thus, the punctuation sensing relay K12 is picked and the following space-space codes or space-carrier return codes are routed as hereinbefore described to pick the Stop relay.

*Sentence mode, margin control on, in margin zone*

In the sentence mode of operation with the margin control on and the end of a sentence occurring in the margin zone, the initial punctuation code is carried in the manner previously described so that, first, punctuation sensing relay K12, FIG. 5, and, then, the following space code will pick and hold the space sensing relay K18 by transfer of contacts K3 (9, 10). Since the margin control is on, margin control relay K16, FIG. 4, is picked and the first space code pulse will be carried From Space, FIG. 3, via 4-2-K16(15, 16) (margin control on)-K15(6, 7) (in the control zone)-K12 (4, 6) (transferred by punctuation code)-K18 (5, 6) (not picked until after space code sensing relay K3 drops out)-CR35-D-3 and To Space to cause a spacing function in the printer. Contacts K18(12, 13) in the Stop circuit are open during the first space pulse and do not close until after the spacing function occurs as previously described.

When a following second space code is received in the margin zone, it is desired to convert the second space code to a carrier return signal. The conversion of the second space code is accomplished by transferring the second space pulse on From Space, FIG. 3, via K16(15, 16) (margin control on)-K15( 6, 7) (in margin zone)-K12(5, 6) (K12 dropped out due to opening of contacts K18(14, 15), FIG. 5, -CR38-K16(11)-CR28, FIG. 3, -EE-6 To Carrier Return and at the same time through CR33, FIG. 3, -K18(12, 13) (transferred when space sensing relay K18, FIG. 4, is picked)-CR30-B-S4(5)-S6(3)-29 to Stop. At the same time, the second space pulse is carried from K12(5, 6), FIG. 3, via CR42, FIG. 4, -K11(1, 4)-18-S6(4)-13 to 125 v. K119(4). With K11, FIG. 4, picked, holding circuit contacts K11(9, 10) are transferred to connect the space sensing relay to 0 volt through K7(8, 9) (which contacts are transferred to disable the holding circuit when the next character code is read)-K6(14, 15)-CR56-K5(14, 15)-14-9. The second space pulse causes a carrier return and the margin zone relay K15 drops out. Then any following space code will generate a space pulse carried over From Space via K16(15, 16) (margin control on)-K15(5, 6) (out of margin zone)-K11(6, 7) (picked by the second space pulse and holding) to Restore to pick a Restore Relay (not shown). In this manner, any additional following spaces will be eliminated so that the next line will have no unwanted indentation. When the restore relay is picked, an interlock in the printer is disabled so that the reader may be cycled without the occurrence of the spacing function.

The second space pulse is also carried via CR42, FIG. 4, -CR43 to pick relay K10 and establish a holding circuit so that contacts K10(6, 7), FIG. 5, are transferred to disable the carrier return forcing circuitry.

When the punctuation code is followed by space-carrier return in the margin zone, obviously there is no second space to be converted to a carrier return and the code itself has the desired characteristics. The carrier return pulse will be carried in the normal manner along From Carrier Return, FIG. 3, -5-1-CR41-K16(12, 13) (margin control on)-K15(15, 16) (in margin zone)-CR40 over to Carrier Return, FIG. 3, via CR28-EE-6 and to Stop, FIG. 3, via CR33-K18(12, 13) (the previous space having been sensed by relay K18)-CR30-B-S4(5)-S6(3)-29.

*Sentence mode, margin control on, outside margin zone*

When the end of a sentence is reached, but not a paragraph, and the punctuation code is followed by space-space outside the margin zone, it is desired to cause the printer to function in accordance with the code and stop the printer operation. When the end of a sentence is reached, but not a paragraph, and the punctuation code is followed by space-carrier return outside the margin zone, it is desired to convert the carrier return to a space. With the margin control on and in the sentence mode and outside the margin control zone, the punctuation relay K12, FIG. 5, will be picked up by the punctuation code as hereinbefore described and the first following space code will cause the space sensing relay K18 to be picked. The first space pulse will be carried over From Space, FIG. 3, via 4-2-K16(15, 16) (margin control on)-K15(5, 6) (out of margin zone)-K11(5, 6) (out of margin zone)-CR35-D-3 and To Space. A following carrier return pulse will be carried along From Carrier Return, FIG. 3, via 5-1-CR41-K16(12, 13) (margin control on)-K15(14, 15) (out of the margin zone)-K9(14, 15) (a paragraph not sensed)-K10(14, 15) (out of margin zone)-K13(14, 15) (no precedent code)-K11(5, 6) (out of margin zone)-CR35-D-3 through To Space. At the same time, the pulse will be carried through K15(5, 6) (out of margin zone)-K16(15, 16) (margin control on)-CR34-K18(12, 13) (space previously sensed)-CR30-B-S4(5)-S6(3)-29 to Stop. A second following space code will be carried through CR34-K18(12, 13) (space sensed)-CR30-B-S4(5)-S6(3)-29 to Stop and through K16(15, 16) (margin control on)-K15(5, 6) (out of margin zone)-K11(5, 6) (out of margin zone)-CR35-D-3 and To Space.

PARAGRAPH MODE

In the paragraph mode of operation, it is desired to stop the automatic reader controlled operation after each paragraph. The presence of a paragraph is sensed by the occurrence of successive carrier returns. The 2 code represents a carrier return.

*Paragraph mode, margin control off*

In the paragraph mode of operation, a first carrier return signal, code 2, picks code sensing relay K2, FIG. 1, across 35 v. gated-14-S6(4)-7-K2-CR2-F-16-K102(4). When a carrier return code 2 is sensed and relay K2 is picked, contacts K2(15, 16), FIG. 4, are transferred to connect a capacitor C2 across 125 v. K119(4) and 0 volt via 13-S6(4)-18-C2-K2(15, 16) (carrier return sensed)-R6-and carrier return decoding matrix K7(5, 6)-K3(14, 15)-K4(8, 9)-K1(14, 15)-K6(14, 15)-CR56-K5(14, 15). Thus, the capacitor C2 is charged. When a 2 code is utilized in combination with any other code, the capacitor circuit will be disabled by transfer of one or more of the decoding matrix contacts. When code sensing relay K2 drops out, contacts K1(14, 15) are transferred and capacitor C2 discharges through K2(14, 15)-CR19 to pick paragraph sensing relay K9. A holding circuit for relay K9 is established by transfer of contacts K9(6, 7) across 125 v. K119(4) and 0 volt via 13-S6(4)-18-K9(1, 4)-CR46-K9(6, 7)-K7(5, 6)-K3(14, 15)-K4(8, 9)-K1(14, 15)-K6(14, 15)-CR56-K5-14-9. The holding circuit is disabled by any other code by transfer of one or more of the contacts K1(14, 15), K3(14, 15), K4(8, 9), K5(14, 15), K6(14, 15), and K7(5, 6) in the decoding matrix.

The first carrier return code causes a pulse to be carried over From Carrier Return, FIG. 3, via 5-1-CR41 through K16(11, 12)(margin control off)-CR28, FIG. 3, -EE-6 and To Carrier Return to cause that function in the printer. The first carrier return code does not stop the printer operation because contacts K9(9, 10), FIG. 3, in the stop circuit are open. However, when the second carrier return code is received, contacts K9(9, 10) have been transferred and the second carrier return code is carrier on To Carrier Return, FIG. 3, to cause that function in the printer and also via K9(9, 10), FIG. 3, -CR29-PJ-1Z-S5(5)-S6(3)-29 to Stop.

*Paragraph mode, margin control on, in margin zone*

If the margin control is on and the margin zone has been reached, the first carrier return pulse is carried over From Carrier Return, FIG. 3, via PJ905(5)-PJ1(1)-CR41-K16(12, 13) (margin control on)-K15(15, 16) (in the margin zone)-CR40-CR28, FIG. 3, along To Carrier Return as hereinbefore described. The second carrier return pulse is carried in a similar manner along To Carrier Return and also to Stop, FIG. 3, through contacts K9(9, 10).

The first carrier return pulse also is carried via CR39, FIG. 3, -K9(11, 12) (K9 not yet picked), FIG. 3, -K10(1, 4), FIG. 4, -18-S6(4)-13-125 v. K119(4) to pick relay K10 and disable the carrier return forcing circuitry by transfer of contacts K10 (6, 7) as hereinbefore described.

*Paragraph mode, margin control on, out of margin zone*

If the margin control is on and the margin zone has not been reached, it is necessary to provide means for distinguishing between a carrier return at the end of a sentence and the first carrier return in a paragraph. The first carrier return is converted to a space function, the second carrier return code is utilized to sense the presence of a paragraph and generate a carrier return function in the printer.

Thus, the first carrier return pulse is carried over From Carrier Return, FIG. 3, via PJ905(5)-PJ1(1)-CR41-K16 (12, 13)(margin control on)-K15(14, 15)(out of margin zone)-K9(14, 15)(paragraph not sensed)-K10(14, 15) (out of margin zone)-K11(5, 6)(out of margin zone)-CR35-D-3 over To Space to convert the carrier return to a space function in the printer as in the sentence mode of operation.

When the margin control is on in the paragraph mode of operation, it is necesary to delay further operation of the printer until a second carrier return is forced. The delay is obtained by sending the second carrier return pulse via From Carrier Return, FIG. 3, -5-1-CR41-K16(12, 13) (margin control on)-K15(14, 15)(out of margin zone)-K9(15, 16)(paragraph sensed by picking K9 after printer functions in response to first carrier return code)-CR36-CR31, FIG. 3, -4-34-Tab Interlock K111–4 which picks the tab interlock relay K111. Contacts K111(9, 10)(not shown) are transferred to complete a holding circuit across 0 volt, FIG. 4, via 9-14-K5(14, 15)-CR56-K6(14, 15)-K1(14, 15)-K4(8, 9)-K3(14, 15)-K7(5, 6)-K9(6, 7) (paragraph sensed)-K10(8, 9)(out of margin zone)-CR21-AA-25-Tab Interlock K111-9-Tab Interlock K111-10, FIG. 3, -2-S-CR31-4-34 to Tab Interlock K111-4.

The second carrier return pulse is also carried through CR40, FIG. 3, -CR28, FIG. 3, -EE-6 over To Carrier Return to cause a carrier return function in the printer. Although contacts K9(9, 10), FIG. 3, in the stop circuit have been transferred, the interlock stop circuitry, FIG. 3, has been picked through CR17 and the stop circuit is disabled. The pulse cannot be carried through CR39, FIG. 3, since contacts K9(11, 12)(paragraph sensed) have been transferred. Since K10, FIG. 4, is not picked, the carrier return forcing circuitry is enabled through contacts K10 (5, 6), FIG. 5.

When the first carrier return function occurs in the printer in response to the second carrier return code, the capacitor C1, FIG. 5, is charged by transfer of switch S653, as previously described, and when the switch S653 is again transferred after the carrier return, the capacitor C1 discharges through FF-D4-S653-(C, NO)-23-25-K13 (11, 12)(there having been no precedent code indicating a heading), FIG. 5, -K16(6, 7)(margin control on)-K10 (5, 6)(out of margin zone)-CR15 and K8(1, 4) to force a second carrier return as previously described. Then, when K8 is dropped and picks K14 by transfer of contacts K8(5, 6), contacts K14(9, 10) are transferred to pick K10 and contacts K10(8, 9) are transferred to disable the holding circuit.

While various aspects of the margin control mode have been described only in connection with the various editing and revision modes, it is to be understood that the margin control mode is operable entirely independently of the editing and revision modes and that the editing and revision modes are operable entirely independently of the margin control mode. However, certain advantages are obtained in combination of control apparatus for both the margin control system and the editing and revision system as will be apparent to those skilled in the art to which the invention relates.

In the illustrative embodiment, a coded data storage device and reader system have been utilized as an input source. However, it is contemplated that the invention may be adapted for use with other data input means independently of or in combination with a data storage device of the general type disclosed.

It is intended that the appended claims be construed to cover the inventive principles as applied to alternative embodiments of the invention except insofar as limited by the prior art.

The invention claimed is:

1. Apparatus for controlling the operation of an output device such as a printer during operation in accordance with input data derived from a data input source such as a reader and a coded data storage device, comprising: margin control means for establishing a margin control mode of operation, sentence end sensing means for sensing the occurrence of the end of a sentence in said printer, margin zone control means for establishing a margin zone and for detecting the occurrence of the end of a sentence in and out of the margin zone, timing circuitry in said printer for carrying a pulse after an operation in the printer is initiated, said sentence end sensing means being connected in circuit with said timing circuitry, enablng means connected to said sentence end sensing means and activated by a pulse on said timing circuitry, space detection means for detecting the occurrence of a spacing function in the printer, said enabling means being connected in circuit with said space detection means to enable said space detection means when the occurrence of punctuation in the printer causes a pulse to be carried from the timing circuitry to the enabling means, space circuitry in said printer for carrying a pulse to cause a spacing operation in said printer and being operative to carry a space pulse following the occurrence of punctuation in the printer to cause a spacing operation in the printer and to activate said space sensing means, carrier return circuitry in said printer for carrying a pulse to cause a carrier return operation in said printer, pulse diverting circuitry connecting said space circuitry and said carrier return circuitry, and enabling means in said pulse diverting circuitry operable following the successive occurrence of punctuation and a previous space pulse by said margin control means and said margin zone control means and said space detection means to divert a space pulse on said space circuitry through said carrier return circuitry to cause a carrier return function in the printer when a sentence ends in the margin zone.

2. The invention as defined in claim 1 and said sentence end sensing means comprising punctuation decoding means connected in circuit with said timing circuitry, and said enabling means being connected to said punctuation decoding means and activated by a pulse on said timing circuitry carried through said punctuation decoding means.

3. The invention as defined in claim 1 and having means to carry a carrier return pulse on said carrier return circuitry following the successive occurrence of punctuation and a following space pulse in the printer to cause a carrier return function in the printer.

4. The invention as defined in claim 1 and having a restore circuit in said printer, and pulse diverting means connecting said space circuitry to said restore circuit after a carrier return function occurs in said printer to divert a following space pulse on said space circuitry to said restore circuit to prevent unwanted indentation in the next line.

5. The invention as defined in claim 1 and having stop circuitry in said printer to stop operation of said printer, and pulse diverting means connecting said space circuitry to said stop circuitry to divert said space pulse to said stop circuitry to stop the operation of said printer after said carrier return.

6. The invention as defined in claim 1 and having carrier return pulse diverting circuit means operable upon the occurrence of a carrier return pulse in the printer out of the margin zone following punctuation and a space to divert the carrier return pulse from the carrier return circuitry to the space circuitry to cause a spacing function in the printer instead of a carrier return.

7. The invention as defined in claim 5 and having stop circuitry in said printer for stopping operation of said printer, and said carrier return pulse diverting circuitry being operable to divert a carrier return pulse to the stop circuitry to stop operation of said printer.

8. Apparatus for controlling the operation of an output device such as a printer during operation in accordance with input data derived from a data input source such as a reader and a coded data storage device, comprising: paragraph sensing means comprising carrier return circuitry in said printer for causing first and second successive carrier returns upon the occurrence of first and second successive carrier return pulses in the printer, carrier return sensing means operative upon the sensing of the occurrence of the first carrier return pulse in the printer, stop circuitry in said printer for stopping operation of said printer, and enabling means in said stop circuitry operable by said carrier return sensing means to connect said stop circuitry to said carrier return circuitry after the occurrence of the first carrier return pulse in the printer to cause the second successive carrier return pulse in said printer to be carried to said stop circuitry to stop operation of said printer after causing a second carrier return function in the printer.

9. Apparatus for controlling the operation of an output device such as a printer during operation in accordance with input data derived from a data input source such as a reader and a coded data storage device, comprising: margin control means for establishing a margin control mode of operation;

margin zone control means for establishing a margin zone;

carrier return circuitry in said printer for causing a carrier return in the printer, carrier return forcing means operable to force a carrier return in said printer, space circuitry in said printer for causing a space function in the printer, and interlock circuitry in said printer for delaying operation of said printer, paragraph sensing means for sensing the occurrence of a paragraph in and out of the margin zone comprising:

carrier return pulse diverting circuitry for diverting a first carrier return pulse on said carrier return circuitry to said space circuitry to cause a space function in said printer, control means conditioned by said first carrier return pulse to connect said carrier return circuitry to said interlock circuitry to carry a second successive carrier return pulse on said carrier return circuitry to cause a first carrier return in said printer and on said interlock circuitry to delay further operation of said printer until the occurrence of a second carrier return function, and activating means associated with said carrier return forcing circuitry and responsive to the occurrence of a carrier return in said printer in response to said second successive carrier return pulse on said carrier return circuitry to activate said carrier return forcing means and cause a second carrier return function in said printer.

10. Apparatus for controlling the operation of an output device such as a printer during operation in accordance with input data derived from a data input source such as a reader and a coded data storage device, comprising:

printer operation controlling circuit means by which the printer is operable in accordance with input data derived from the reader and coded data storage device, input data sensing means responsive to a grammatical condition in the input data, operational controlling means operatively associated with said input data sensing means and connected in circuit with said printer operation controlling circuit means to vary the operation of the printer in accordance with a grammatical condition sensed in the input data, margin control means for establishing a righthand margin during printer operation and terminating a line of type at the righthand margin at a grammatically correct juncture in the input data, margin circuit means for indicating when the margin is reached during printer operation, a first control means in circuit with said margin circuit means and associated with said printer and operative when said margin is reached in the printer to activate said margin circuit means, holding means associated with said margin circuit means to continue to activate said margin circuit means regardless of the condition of said first control means, and a second control means in circuit with said holding means and associated with said printer and operative after a carrier return to disable said holding means and de-activate said margin circuit means.

11. The invention as defined in claim 10 and comprising:

margin setting mechanism in said printer for establishing a margin, margin indicating means in said printer operable when said printer reaches a set margin, said first control means being operatively associated with said margin indicating means in said printer and operable thereby, carrier return indicating means in said printer operable during a carrier return, and said second control means being operatively associated with said carrier return indicating means in said printer and operable thereby.

12. Apparatus for controlling the operation of an output device such as a printer during operation in accordance with input data derived from a data input source such as a reader and a coded data storage device, comprising:

printer operation controlling circuit means by which the printer is operable in accordance with input data derived from the reader and coded data storage device, printer clutch means operable to control printing operations in the printer, printer clutch circuitry through which pulses causing operation of the printer clutch means are carried, decoding means in said printer clutch circuitry for sensing the occurrence of a hyphen code and being operative when any code other than a hyphen code occurs to enable operation of the printer clutch means, margin control means to establish a margin control zone in a margin control mode of operation and being associated with said printer clutch circuitry and operable out of the margin control mode to utilize the occurrence of a hyphen code to enable operation of the printer clutch, hyphenating control circuitry associated with said printer clutch circuitry, said margin control means being associated with said hyphenating control circuitry and operative to connect said hyphenating control circuitry to said printer clutch circuitry in the margin control mode, and hyphen code detection means in said hyphenating control circuitry to detect the occurrence of a hyphen outside of the margin zone and to disable the printer clutch circuitry to prevent printing of the hyphen.

13. The invention as defined in claim 12 and comprising restore means simultaneously operable with said hyphen code detection means to cause the operation of said printer to continue without printing of the hyphen when the occurrence of a hyphen outside the margin zone is detected.

14. The invention as defined in claim 12 comprising hyphen code detection means in said hyphenating control circuitry to detect the occurrence of a hyphen in the margin zone and enable the printer clutch circuitry to cause printing of a hyphen in the margin zone.

15. The invention as defined in claim 12 and having means in said hyphenating control circuitry to differentiate between a hyphen code and an underscore code to cause an underscore to be printed by actuation by said printer clutch circuitry.

16. The invention as defined in claim 12 and having precedent code means in said hyphenating circuitry to detect the occurrence of a hyphen to be printed and cause a hyphen to be printed by said actuation of said printer clutch circuitry.

17. The invention as defined in claim 12 and having carrier return forcing means associated with said hyphen code detection means to cause a carrier return operation in said printer after the detection and printing of a hyphen in the margin zone.

18. The invention as defined in claim 17 and wherein said carrier return forcing means comprises:

carrier return circuit means operable to cause a carrier return function in said printer, carrier return forcing circuit means associated with said carrier return circuit means, and enabling means for said carrier return forcing circuit means operable in response to the detection of a hyphen in the margin zone.

19. The invention as defined in claim 18 and having operation delay means associated with said printer to delay further operation of said printer when the occurrence of a hyphen in said margi nzone is detected until a carrier return is forced.

20. The invention as defined in claim 18 and having activating means enabled upon detection of a hyphen in the margin zone, and control means operative after the printing of a hyphen in the margin zone to connect said activating means to said carrier return forcing circuitry to cause a carrier return in said printer.

21. Apparatus for controlling the operation of an output device such as a printer during operation in accordance with input data derived from a data input source such as a reader and a coded storage device comprising:

printer operation controlling circuit means by which the printer is operable in accordance with input data derived from the reader and coded data storage device, margin control means for establishing a margin control mode of operation, word end sensing means for sensing the occurrence of the end of a word in said printer, margin zone control means for establishing a margin zone and for detecting the occurrence of the end of a word in and out of the margin zone, space circuitry in said printer for carrying a pulse to cause a spacing operation in said printer, carrier return circuitry in said printer for carrying a pulse to cause a carrier return operation in said printer, pulse diverting circuitry connecting said space circuitry and said carrier return circuitry, enabling means in said pulse diverting circuitry operable by said word end sensing means and said margin control means and said margin zone control means to divert a space pulse on said space circuitry through said carrier return circuitry to cause a carrier return function in the printer when the word end sensing means senses the end of a word and the margin control means has established the margin control mode of operation and the margin zone control means senses the occurrence of the end of the word in the margin zone, carrier return forcing circuitry, disabling means in said carrier return forcing circuitry, and said disabling means being connected to said diverting circuitry to disable said carrier return forcing means when a space pulse on said spacing circuitry is diverted through said carrier return circuitry.

22. Apparatus for controlling the operation of an output device such as a printer during operation in accordance with input data derived from a data input source such as a reader and a coded data storage device comprising printer operation controlling circuit means by which the printer is operable in accordance with input data derived from the reader and coded data storage device, space circuitry in said printer for carrying a pulse to cause a spacing operation in said printer, carrier return circuitry in said printer for carrying a pulse to cause a carrier return operation in said printer, restore circuitry in said printer for causing the printer to cycle without performing a printing or functional operation, margin control means for establishing a margin control mode of operation in which a carrier return operation may be followed by a space which would provide unwanted indentation in the next line of type, and unwanted indentation control means actuable to connect said space circuitry to said restore circuit to prevent unwanted spacing in the printer after a carrier return.

References Cited

UNITED STATES PATENTS

| | | | |
|---|---|---|---|
| 3,063,536 | 11/1962 | Dirke | 197—19 |
| 3,260,340 | 7/1966 | Locklar et al. | 197—19 |
| 2,297,789 | 10/1942 | Mills et al. | 197—20 |
| 3,297,124 | 1/1967 | Sims | 197—19 |

ROBERT E. PULFREY, *Primary Examiner.*

E. S. BURR, *Examiner.*